United States Patent Office 3,382,238
Patented May 7, 1968

3,382,238
PENICILLIN AND CEPHALOSPORIN
DERIVATIVES
Joseph E. Dolfini, North Brunswick, N.J., assignor to E. R.
Squibb & Sons, Inc., New York, N.Y., a corporation of
Delaware
No Drawing. Filed Apr. 27, 1967, Ser. No. 634,115
11 Claims. (Cl. 260—239.1)

ABSTRACT OF THE DISCLOSURE

This invention relates to novel therapeutic agents related to penicillin and cephalosporin C. The compounds of this invention contain the penicillin and cephalosporin C chemical structure substituted at the 6- or 7-position, respectively with substituted alkyl or aryl sulfinylaryl radicals.

These compounds possess a high degree of antibacterial activity against a large number of microorganisms. In addition, the compounds of this invention are useful as animal feed supplements and as the active ingredient in germicidal preparations employed to disinfect walls, tables, and the like.

Detailed description

This invention relates to novel therapeutic agents related to penicillins and cephalosporin C and which have activity as antimicrobial agents.

Compounds of the present invention may be represented by the following structural formula (I)

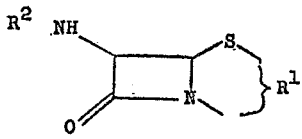

wherein $R^1$ is either (II)

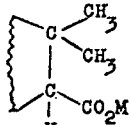

or (III)

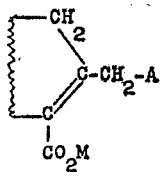

wherein A is a member selected from the group consisting of the acyloxy radical of a hydrocarbon carboxylic acid of less than twelve carbon atoms, as exemplified by the lower alkanoic acids (e.g., acetic, propionic, butyric, valeric and caproic acid), the lower alkenoic acids (e.g., 2-butenoic acids), the cycloalkanecarboxylic acids, the cycloalkenecarboxylic acids, the monocyclic aryl(lower alkanoic acids) (e.g., phenylacetic and β-phenylpropionic acid), and the monocyclic aryl carboxylic acids (e.g., benzoic and p-toluic acid); a quaternary ammonium radical, e.g., tetramethylammonium, pyridinium, quinolinium, picolinium, etc.; amino; lower alkyl amino, such as ethyl amino or isopropylamino; di(lower alkyl)amino; monocyclic aryl-lower alkylamino; di(monocyclic aryl-lower alkyl)amino; heterocyclic tertiary amino such as imidazolyl and piperidino; and when taken together with M, a monovalent carbon-oxygen bond; and M is a member selected from the group consisting of hydrogen, a pharmaceutically acceptable nontoxic cation, an anionic charge when A is a quaternary ammonium radical, and when taken together with A, a monovalent carbon-oxygen bond; and $R^2$ is represented by (IV)

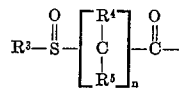

wherein $R^3$ represents lower alkyl, monocyclic aryl or monocyclic aryl-lower alkyl; $R^4$ and $R^5$, taken separately, each represent hydrogen, lower alkyl, monocyclic aryl, or monocyclic aryl-lower alkyl; and $n$ is 1, 2 or 3.

The term "lower alkyl," as employed herein include both straight and branched chain radicals of less than eight carbon atoms. Lower alkyl groups are exemplified by methyl, ethyl, propyl, isopropyl, n-butyl, 1,1-dimethyl-butyl and n-hexyl.

By monocyclic aryl is meant phenyl and substituted phenyl radicals such as lower alkyl phenyl, as exemplified by o-, m-, or p-tolyl and ethylphenyl, di(lower alkyl) phenyl is exemplified by p-xylyl, lower alkoxyphenyl as exemplified by methoxyphenyl and propoxyphenyl and halophenyl as exemplified by chloro-, bromo-, iodo- and fluorophenyl.

As pharmaceutically acceptable cations may be mentioned metallic cations such as sodium, potassium, calcium and aluminum and organic amine cations such as trialkylamines, e.g., triethylamine, procaine, dibenzylamine, N-benzyl-β-phenethylamine, 1-ephenamine, N,N'-dibenzylethylenediamine, dehydroabietylamine, N,N'-bis-dehydroabietylethylenediamine, N - (lower)alkylpiperidines, e.g., N-ethylpiperidine, quaternary ammonium ions (e.g., tetramethylammonium, tetraethylammonium, pyridinium and the like), and other amines which have been used to form salts with benzylpenicillin.

Particularly preferred compounds of this invention are those wherein A is selected from the group consisting of acetoxy and pyridinium, and M is selected from the group consisting of an alkali metal and, when A is pyridinium, an anionic charge.

Compounds of this invention (i.e., the compounds of Formula I) are physiologically active substances which have a high degree of antibacterial activity against a large number of microorganisms, including Gram positive and Gram negative microorganisms such as Staphylococcus, aureus, Escherichia coli, Klebsiella pneumoniae, Aerobacter aerogenes, and Shigella sonnei.

For these purposes, they may be administered orally or parenterially in such form as tablets, capsules, injectables, or the like by incorporating the appropriate dosage of the compound with carriers according to standard pharmaceutical practices. Dosages for various mammillary species (e.g., rats, dogs, cats, cattle, horses, etc.) would be from about 0.01 to about 1.5 gm./kg. daily, administered once to several times a day.

In addition, the compounds of this invention are useful as supplements to animal feeds, such as for poultry, cattle and swine (particularly meanling pigs) as an aid in increasing growth rate, improved feed efficiency, and in the suppression of infections during periods of stress, such as weaning, castration, vaccination, high temperature and moving. For such purposes the concentration in the animal feed would range from about 10 to 400 grams per ton, optimally about 200 grams per ton.

Further, the compounds of this invention, in aqueous solution or suspension, may be employed as disinfectants against various staphylococci. For this purpose, they are dissolved or suspended in water, preferably also containing a detergent, at a concentration of about 0.5% to about 10% and may be used as washes to disinfect walls, floors, tables and the like.

Compounds in accordance with Formula I are prepared by coupling of alkylsulfinylcarboxylic acids having the formula (V)
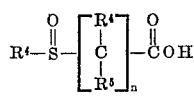

wherein $R^3$, $R^4$ and $R^5$ are as set forth above, with amino compounds having the formula

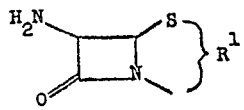

by procedures well known in the art, employing known coupling agents such as dicyclohexylcarbodiimide, bis-(imidazolyl)-carbonyl or ethoxy acetylene, or mixed anhydrides. The applications of these methods in amide synthesis have been reviewed by M. Ondetti and M. Bodanszky, "Peptide Synthesis," Interscience, New York, 1966.

Alternatively, acids in accordance with Formula V can be converted to their corresponding activated forms having the formula (VII)
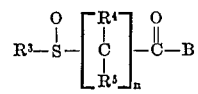

wherein $R^3$, $R^4$, $R^5$ and $n$ are as set forth hereinabove and B represents halogen, azide or p-nitrophenoxy, employing the appropriate reagents in known fashion (Bodanszky and Ondetti, op. cit.). Compounds obtained according to Formula VII are then reacted with the amino compound of Formula VI in the presence of a base such as pyridine, triethylamine or sodium bicarbonate to provide compounds of this invention in accordance with Formula I.

Those compounds in accordance with Formula I wherein $R^1$ is represented by Formula III and A is other than acetoxy are generally prepared from the acetoxy derivative by nucleophilic displacement of the acetoxy group by the appropriate group. For example, a compound in accordance with Formula I wherein $R^1$ is III and A is acetoxy may be reacted with, for instance, pyridine, under aqueous conditions at 35 to 45° C. at a pH of about 5 to 8. Alternatively, of course, compounds in accordance with Formula VI may be converted to the desired derivatives in the above manner and then subjected to the described coupling reaction to form final products of this invention under aqueous conditions at 35 to 45° C. at a pH range of 5 to 8.

Derivatives in accordance with Formula I wherein A and M are taken together forming a monovalent carbon-oxygen bond may be prepared by acid hydrolysis of compounds according to either Formulas I or VI, wherein A is acetoxy, to form a 7-substituted 3-hydroxy methyldecephalosporanic acid lactone.

Alternatively, enzymatic hydrolysis of compounds of Formula I or VI, wherein A is acetoxy may provide 7-substituted deacetyl cephalosporanic acid, wherein A is hydroxy, and these hydroxy compounds may be caused to form the lactones by acid treatment.

As indicated, these reactions may be performed either before or after the coupling reaction in forming products in accordance with this invention.

Compounds according to Formula V are prepared by the oxidation of the corresponding sulfides of the type (Va)
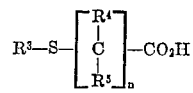

by treatment with peracids such as m-chloroperbenzoic acid or by hydrogen peroxide, either in admixture with benzene, acetic acid, methylene chloride or mixtures thereof.

The sulfides Va are obtained from the equimolar amounts of halides of the type $R^3X$ with mercaptoacids having the formula (Vb)
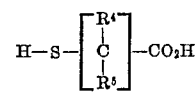

in the presence of at least two moles per mole of reactants of a base, such as aqueous sodium hydroxide, alcoholic potassium hydroxide or potassium t-butoxide, in dimethylformamide at ambient temperatures.

Among the halides of the type $R^3X$ may be mentioned:
iodomethane
bromoethane
1-iodohexane
1-chloro-3,3-dimethylpentane
2-iodo-1-(iodomethyl)benzene
1-chloro-2-phenylethane
1-chloro-2-methyl-2-phenylethane
2-chloro-2-(4-chlorophenyl)ethane
1-iodo-3-(4-methoxyphenyl)propane.

Among the mercapto acids of Formula Vb may be mentioned:
2-mercaptoethanoic acid
2-mercaptopropanoic acid
4-mercaptohexanoic acid
3-mercaptononanoic acid
2-mercapto-5,5-dimethylhexanoic acid
2-mercapto-3,3-dimethylbutanoic acid
2-mercapto-2-phenylethanoic acid
2-mercapto-2-(4-tolyl)ethanoic acid
2-mercapto-2-(2-methoxyphenyl)ethanoic acid
2-mercapto-2-(4-ethylphenyl)ethanoic acid
2-mercapto-2-(4-chlorophenyl)ethanoic acid
2-mercapto-2-(2,4-dibromophenyl)ethanoic acid
3-mercapto-3-phenylpropanoic acid
2-mercapto-3-(4-methoxyphenyl)pentanoic acid
4-mercapto-6-(2-tolyl)hexanoic acid
2-mercapto-3,3-dimethyl-4-(4-fluorophenyl)butanoic acid
2-mercapto-2-methylpropanoic acid
2-mercapto-2-ethylbutanoic acid
3-mercapto-2-propylhexanoic acid
2-mercapto-2-ethyl-3,3-dimethylbutanoic acid
2-mercapto-2-phenylpropanoic acid
2-mercapto-2-(2,4-dimethoxyphenyl)-3-methylpentanoic acid
2-mercapto-2-(3-chlorophenyl)butanoic acid
3-mercapto-2-(2,4,6-trimethylphenyl)propanoic acid
2-mercapto-2-ethyl-6-(4-methoxyphenyl)hexanoic acid
2-mercapto-2-isopropyl-4-(3-chlorophenyl)-6,6-dimethylheptanoic acid
2-mercapto-2-methyl-3-phenylpropanoic acid
2-mercapto-2-(p-xylyl)butanoic acid
2-mercapto-2,2-diphenylethanoic acid
2-mercapto-2-phenyl-2-(p-xylyl)ethanoic acid
2-mercapto-2,2-di(4-chlorophenyl)ethanoic acid
2-mercapto-2-(3-propoxyphenyl)-2-(3,5-dimethylphenyl)ethanoic acid
2-mercapto-2,3-diphenylpropanoic acid
2-mercapto-2-phenyl-3,3,4,4-tetramethyl-5-phenyl-pentanoic acid
2-mercapto-2-phenyl-4-(4-methoxyphenyl)butanonic acid
2-mercapto-2-(2,4-dimethoxyphenyl)-3-(4-iodophenyl)propanoic acid
2-mercapto-2-benzyl-3-phenylpropanoic acid
2-mercapto-2-($\alpha$-methylbenzyl)-3,3,4-trimethyl-4-phenylpentanoic acid
2-mercapto-2-(2-methoxybenzyl)-4-(4-fluorophenyl)butanoic acid
4-mercapto-2-(p-xylyl)-6-phenylhexanoic acid.

Alternatively, the sulfides Va are obtained by equimolar reaction of mercaptans of the type R³SH with haloacids of the type (Vc) 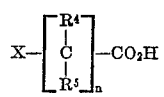

wherein X represents a hologen atom in the presence of two or more equivalents of a base as set forth in the preceding preparation of compounds in accordance with Formula Va.

Among the suitable compounds of the type R³SH may be mentioned:

methanethiol
ethanethiol
propanethiol
t-butanethiol
1-hexanethiol
3,3-dimethylpentanethiol
benzenethiol
2-chlorobenzenethiol
4-chlorobenzenethiol
2-fluorobenzenethiol
4-fluorobenzenethiol
2-bromobenzenethiol
3,5-dichlorozenethiol
2,4,6-trifluorobenzenethiol
o-toluenethiol
p-toluenethiol
2,4-dimethylbenzenethiol
2-ethylbenzenethiol
4-n-propylbenzenethiol
4-t-butylbenzenethiol
4-n-hexylbenzenethiol
2-methoxybenzenethiol
4-methoxybenzenethiol
3,5-dimethoxybenzenethiol
4-etheoxybenzenethiol
4-propoxybenzenethiol
benzenemethanethiol
o-methylbenzenemethanethiol
α-methylbenzeneethanethiol
α-methyl-p-chlorobenzenemethanethiol
3-(p-methoxy-benzene)propane-1-thiol.

Among the haloacids having the Formula Vc may be mentioned:

2-chloroethanoic acid
2-bromohexanoic acid
2-iodononanoic acid
2-chloro-5,5-dimethylhexanoic acid
2-bromo-3,3-dimethylbutanoic acid
2-chloro-2-phenylethanoic acid
2-bromo-2-(2-methoxyphenyl)ethanoic acid
2-iodo-2-(4-ethylphenyl)ethanoic acid
2-chloro-2-(4-chlorophenyl)ethanoic acid
2-bromo-2-(2,4-dibromophenyl)ethanoic acid
2-chloro-3-phenylpropanoic acid
2-bromo-3-(4-methoxyphenyl)pentanoic acid
2-iodo-6-(2-tolyl)hexanoic acid
2-chloro-2-methylpropanoic acid
2-bromo-2-ethylbutanoic acid
2-iodo-2-ethyl-3,3-dimethylbutanoic acid
2-chloro-2-phenylpropanoic acid
2-bromo-2-(2,4-dimethoxyphenyl)-3-methylpentanoic acid
2-iodo-2-(2,4,6-trimethylphenyl)propanoic acid
3-chloro-2-ethyl-6-(methoxyphenyl)hexanoic acid
5-bromo-2-isopropyl-4-(3-chlorophenyl)-6,6-dimethylheptanoic acid
3-iodo-2-(p-xylyl)butanoic acid
2-chloro-2,2-diphenylethanoic acid
2-bromo-2-phenyl-2-(p-xylyl)ethanoic acid
2-iodo-2-(3-propoxyphenyl)-2-(3,5-dimethylphenyl)ethanoic acid
2-chloro-2,3-diphenylpropanoic acid 2-bromo-2-phenyl-3,3,4,4-tetramethyl-5-phenyl-pentanoic acid
2-iodo-2-(2,4-dimethoxyphenyl)-3-(4-iodophenyl)propanoic acid
2-chloro-2-benzyl-3-phenylpropanoic acid
2-bromo-2-(α-methylbenzyl)-3,3,4-trimethyl-4-phenyl-pentanoic acid
4-iodo-2-(p-xylyl)-6-phenylhexanoic acid.

The following examples illustrate the invention. All temperatures are in degrees centigrade unless otherwise stated.

EXAMPLE 1

7-[3-(methylsulfinyl)propionamido]cephalosporanic acid, potassium salt

A solution of 2.72 g. of 7-aminocephalosporanic acid and 0.84 g. sodium bicarbonate in a solution of 30 ml. of water and 30 ml. of acetone (or 60 ml. dimethylformamide may be used as the solvent) is treated with 1.06 g. of 3-(methylsulfinyl)propionic acid and 2.06 g. dicyclohexylcarbodiimide. After stirring the reaction mixture at room temperature for three hours, the precipitated dicyclohexylurea is filtered off. The solution is diluted with 100 ml. of ice water, acidified with dilute hydrochloric acid, and extracted with 3× 50 ml. $CHCl_3$. The chloroform extract is dried ($MgSO_4$), filtered and evaporated at reduced pressure. The residual cephalosporin C derivative is taken up in 95% ethanol and treated with an equivalent of aqueous KOH. The potassium salt of the product is obtained in crude form by evaporation and is purified by crystallization from aqueous acetone or alcohol.

EXAMPLE 2

6-[3-(methylsulfinyl)propionamido]penicillanic acid, potassium salt

Substitution of 2.16 g. of 6-aminopenicillanic acid for the 7-aminocephalosporanic acid in Example 1 leads to the penicillin derivative as the potassium salt.

EXAMPLE 3

7-[3-(phenylsulfinyl)propionamido]cephalosporanic acid, potassium salt

Following the procedure of Example 1 but substituting an equivalent amount of 3-(phenylsulfinyl)propionic acid for the 3-methylsulfinylpropionic acid, the desired product is obtained.

EXAMPLE 4

7-[2-methylsulfinyl)-2-methylpropionamido] cephalosporanic acid, potassium salt

Following the procedure of Example 1 but substituting an equivalent amount of 2-(methylsulfinyl)-2-methylpropionic acid for the 3-methylsulfinylpropionic acid, the desired product is obtained.

EXAMPLE 5

7-[4-methylsulfinyl)-3-phenylbutyramido]cephalosporanic acid, potassium salt

Following the procedure of Example 1 but substituting an equivalent amount of 4-(methylsulfinyl)-3-phenylbutyric acid for the 3-(methylsulfinyl)propionic acid, the desired product is obtained.

EXAMPLE 6

7-[2-benzyl-3-(ethylsulfinyl)propionamido]cephalosporanic acid, potassium salt

Following the procedure of Example 1 but substituting an equivalent amount of 2-benzyl-3-(ethylsulfinyl) propionic acid for the 3-(methylsulfinyl)propionic acid, the desired product is obtained.

EXAMPLE 7

7-[3-(ethylsulfinyl)propionamido]cephalosporanic acid, potassium salt

A solution of 1.50 g. of 3-(ethylsulfinyl)propionic acid and 1.01 g. of triethylamine in 50 ml. of acetonitrile is treated with 1.10 g. of ethyl chloroformate for 20 minutes at 0° C. The resulting mixture is then treated with a mixture of 2.72 g. of 7-aminocephalosporanic acid and 1.01 g. of triethylamine in 50 ml. of acetonitrile precooled to 0° C. The resulting reaction mixture is stirred at 0° C. for two hours, then diluted with 200 ml. of ice water, acidified with dilute hyrochloric acid and extracted with 4× 50 ml. chloroform. The chloroform extracts are dried ($Na_2SO_4$), filtered, and evaporated at reduced pressure. The residual crude product is taken up in ethanol (ca. 25 ml.) and treated with an equivalent of aqueous potassium hydroxide. The resulting potassium salt may be purified by crystallization from aqueous acetone or alcohol.

EXAMPLE 8

6-[3-ethylsulfinyl)propionamido]penicillanic acid, potassium salt

Substitution of 2.16 g. of 6-aminopencillanic acid for the 7-aminocephalosporanic acid in Example 7 leads to the penicillin derivative as its potassium salt.

EXAMPLE 9

7-[2,3-diphenyl-2-(propylsulfinyl)propionamido] cephalosporanic acid, potassium salt Following the procedure of Example 7 but substituting an equivalent amount of 2,3-diphenyl-2-(propylsulfinyl) propionic acid for the 3 - (ethylsulfinyl)propionic acid, the desired product is obtained.

EXAMPLE 10

7-[3-benzyl-3-methyl-4-(benzylsulfinyl)butyramido] cephalosporanic acid, potassium salt Following the procedure of Example 7 but substituting an equivalent amount of 3-benzyl-3-methyl - 4 - (benzylsulfinyl)butyric acid for the 3-(ethylsulfinyl)propionic acid, the desired product is obtained.

EXAMPLE 11

6-[3-benzylsulfinyl)propionamido]pinicillanic acid, potassium salt

A solution of 1.98 g. of 3-benzylsulfinylpropionic acid [obtained by peroxide oxidation of 3-(benzylthio)propionic acid], 1.3 g. of p-nitrophenol and 2.06 g. of dicyclohexylcarbodiimide in 50 ml. of ethyl acetate is stirred for one hour at room temperature. The solution is then filtered and evaporated at reduced pressure. The crude p-nitrophenyl ester is taken up in 30 ml. of dioxane and added to a solution of 2.16 g. of 6-aminopencillanic acid and 1.01 g. triethylamine in 50 ml. dioxane. The resulting mixture is stirred overnight at room temperature, and then evaporated at reduced pressure. The gummy residue is partitioned between 3% aqueous hydrochloric acid and chloroform. The chloroform solution is dried ($Na_2SO_4$), filtered and evaporated at reduced pressure. The residue of crude product is taken up in ethanol and treated with an equivalent of aqueous potassium hydroxide. The resulting potassium salt may be recrystallized from aqueous acetone or ethanol.

EXAMPLE 12

7-[3-(benzylsulfinyl)propionamido]cephalosporanic acid, potassium salt

Use of 2.72 g. of 7-aminocephalosporanic acid in place of the 6-aminopenicillanic acid in Example 11 gives the potassium salt of the penicillin derivative.

EXAMPLE 13

6-[2-ethylsulfinyl)-2-methylpropionamido]penicillanic acid, potassium salt

Following the procedure of Example 11 but substituting an equivalent amount of 2-(ethylsulfinyl)-2-methylpropionic acid for the 3-(benzylsulfinyl)propionic acid, the desired product is obtained.

EXAMPLE 14

6-[3-(benzylsulfinyl)butyramido]penicillanic acid, potassium salt

Following the procedure of Example 11 but substituting an equivalent amount 3-(benzylsulfinyl)butyric acid for the 3-benzylsulfinylpropionic acid, the desired product is obtained.

EXAMPLE 15

6-[2-methyl-2-(phenethylsulfinyl)propionamido] penicillanic acid, potassium salt Following the procedure of Example 11 but substituting an equivalent amount of 2-methyl - 2 - (phenethylsulfinyl)propionic acid for the 3-(benzylsulfinyl)propionic acid, the desired product is obtained.

EXAMPLE 16

7-[3-(methylsulfinyl)propionamido]-3-(1-pyridiniummethyl)-ceph-3-em-4-carboxylate A solution of 1.0 g. of 7-[3 - (methylsulfinyl)propionamido]cephalosporanic acid and 0.5 ml. of pyridine in 30 ml. of water is stirred at 35–45° C. for 14 hours and then is freeze dried to give the crude product. Purification is effected by passing an aqueous solution of the crude product through an ion exchange column using Amberlite IRC–50 (acid form).

EXAMPLE 17

7-[3-(methylsulfinyl)propionamido]-3-(1-methylammoniummethyl)ceph-3-em-4-carboxylate Following the procedure of Example 16 but substituting equivalent amounts of methylamine for the pyridine, there is obtained the desired product.

EXAMPLE 18

7-[3-methylsulfinyl)propionamido]-3-(1-diethylammoniummethyl)-ceph-3-em-4-carboxylate Following the procedure of Example 16 but substituting equivalent amounts of diethylamine for the pyridine, there is obtained the desired product.

EXAMPLE 19

7-[3-(methylsulfinyl)propionamido]-3-(1-phenylammoniummethyl)-ceph-3-em-4-carboxylate Following the procedure of Example 16 but substituting equivalent amounts of aniline for the pyridine, the desired product is obtained.

EXAMPLE 20

7-[2-methyl-2-(methylsulfinyl)propionamido]deacetyl cephalosporanic acid

To a solution of 1.0 g. of 7-[2 - methyl - 2 - (methylsulfonyl)propionamido]cephalosporanic acid as the sodium salt in 10 ml. of water at 30° C. is added 4.0 ml. of orange peel (citrus) acetyl esterase solution [Jeffery et al., Biochem. J., 81, 591 (1961)] and the pH kept at 6.6 by automatic addition of N/10 aqueous sodium hydroxide. After the consumption of 0.95 equivalent of sodium hydroxide, the mixture is freeze dried to provide the crude product, sodium salt. This is sufficiently pure for further conversion.

EXAMPLE 21

7-[2-methyl-2-(methylsulfinyl)propionamido]-3-benzoyloxymethyl-ceph-3-em-4-carboxylate To a solution of 400 mg. of 7-[2 - methyl - 2 - (methylsulfinyl)propionamido]-3-hydroxymethyl - ceph - 3-em-4-carboxylate, sodium salt in 5 ml. of redistilled dimethylformamide at 10°±5° C. is added benzoyl chloride, 154 mg., in 4 ml. of dimethylformamide over a 15 minute interval. The resulting solution is stirred for two hours and then poured into an excess of 30 ml. of ice cold 2.5% aqueous sodium bicarbonate solution. After working with 3× 15 ml. chloroform, the aqueous solution is acidified and the product extracted with 2× 15 ml. of chloroform. After drying ($Na_2SO_4$) and filtering the product solution evaporation at <10° C. by vacuum gives the product as an amorphous powder.

The carboxylic acid is converted to its sodium salt by adding an equivalent amount of aqueous N/10 sodium hydroxide to a solution of the crude acid in alcohol; dilution with ether and chilling induces the precipitation of the sodium salt.

EXAMPLE 22

7-[2-methyl-2-(methylsulfinyl)propionamido]deacetyl cephalosporanic acid lactone A solution of 500 mg. of 7-[2-methyl-2-(methylsulfinyl)propionamido]deacetyl cephalosporanic acid in 5 ml. of acetone is treated with 5 ml. of concentrated hydrochloric acid; after 20 minutes, the reaction mixture is neutralized with excess aqueous sodium bicarbonate. Extraction with chloroform gives, after drying over sodium sulfate, an evaporation at <10° C., the lactone as a powder. This material may be purified by crystallization from hexane-ethyl acetate.

What is claimed is:

1. A therapeutically active compound having the formula

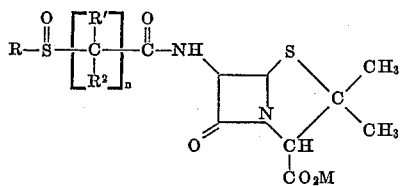

wherein M is a member selected from the group consisting of hydrogen and a pharmaceutically acceptable non-toxic cation, R is selected from the group consisting of lower alkyl, monocyclic carbocyclic aryl and monocyclic carbocyclic aryl-lower alkyl, $R^1$ and $R^2$ are each selected from the group consisting of hydrogen, lower alkyl, monocyclic carbocyclic aryl and monocyclic carbocyclic aryl-lower alkyl and $n$ is 1, 2, or 3.

2. A therapeutically active compound having the formula

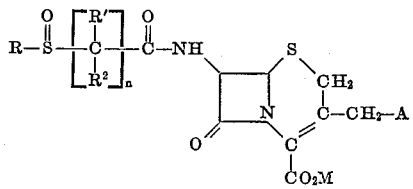

wherein A is a member selected from the group consisting of the acyloxy radical of a hydrocarbon carboxylic acid of less than twelve carbon atoms; a quaternary ammonium radical; amino, lower alkyl amino; di(lower alkyl)amino; monocyclic carbocyclic aryl-lower alkyl amino; imidazolyl and piperidino; and when taken together with M, a monovalent carbon-oxygen bond; and M is a member selected from the group consisting of hydrogen, a pharmaceutically acceptable non-toxic cation, an anionic charge when A is a quaternary ammonium radical, and when taken together with A, a monovalent carbon-oxygen bond; and wherein R, $R^1$, $R^2$ and $n$ are as set forth in claim 1.

3. A compound in accordance with claim 2 wherein A is selected from the group consisting of acetoxy and pyridinium and M is selected from the group consisting of an alkali metal and when A is pyridinium, an anionic charge.

4. A compound in accordance with claim 2 having the name 7-[3-(methylsulfinyl)propionamido]cephalosporanic acid, potassium salt.

5. A compound in accordance with claim 1 having the name 6 - [3 - (methylsulfinyl)propionamido]penicillanic acid, potassium salt.

6. A compound in accordance with claim 2 having the name 7-[3 - (ethylsulfinyl)propionamido]cephalosporanic acid, potassium salt.

7. A compound in accordance with claim 1 having the name 6-[3-(ethylsulfinyl)propionamido]penicillanic acid, potassium salt.

8. A compound in accordance with claim 1 having the name 6-[3-(benzylsulfinyl)propionamido]penicillanic acid, potassium salt.

9. A compound in accordance with claim 2 having the name 7-[3-(benzylsulfinyl)propionamido]cephalosporanic acid, potassium salt.

10. A compound in accordance with claim 2 having the name 7-[3 - (methylsulfinyl)propionamido] - 3 - (1-pyridinium-methyl)-ceph-3-em-4-carboxylate.

11. A compound in accordance with claim 2 having the name 7-[2 - (methylsulfinyl) - 2 - methylpropionamido] cephalosporanic acid, sodium salt.

References Cited

UNITED STATES PATENTS 3,335,136   8/1967   Flynn _____ 260—243

NICHOLAS S. RIZZO, *Primary Examiner.*